(12) United States Patent
Dingman

(10) Patent No.: US 10,961,630 B2
(45) Date of Patent: Mar. 30, 2021

(54) SYSTEMS, APPARATUSES, AND METHODS TO ASSESS CORROSION PREVENTION

(71) Applicant: Delta SubSea LLC, Montgomery, TX (US)

(72) Inventor: Scott P. Dingman, Montgomery, TX (US)

(73) Assignee: DELTA SUBSEA LLC, Montgomery, TX (US)

( * ) Notice: Subject to any disclaimer, the term of this patent is extended or adjusted under 35 U.S.C. 154(b) by 314 days.

(21) Appl. No.: 16/013,590

(22) Filed: Jun. 20, 2018

(65) Prior Publication Data

US 2018/0363149 A1 Dec. 20, 2018

Related U.S. Application Data

(60) Provisional application No. 62/522,468, filed on Jun. 20, 2017.

(51) Int. Cl.
| | | |
|---|---|---|
| *C23F 13/22* | (2006.01) | |
| *G01N 17/02* | (2006.01) | |
| *G01S 19/14* | (2010.01) | |
| *C23F 13/04* | (2006.01) | |

(52) U.S. Cl.
CPC .............. *C23F 13/22* (2013.01); *C23F 13/04* (2013.01); *G01N 17/02* (2013.01); *G01S 19/14* (2013.01); *C23F 2213/31* (2013.01); *C23F 2213/32* (2013.01)

(58) Field of Classification Search
CPC ........ G01N 17/02; G01N 17/04; C23F 13/00; C23F 13/02–12; C23F 13/22; C23F 2213/31; C23F 2213/32; B62D 57/00
See application file for complete search history.

(56) References Cited

U.S. PATENT DOCUMENTS

| | | |
|---|---|---|
| 4,078,510 A | 3/1978 | Morgan |
| 5,216,370 A | 6/1993 | Bushman et al. |

(Continued)

FOREIGN PATENT DOCUMENTS

WO 2012112557 8/2012

*Primary Examiner* — Gurpreet Kaur
(74) *Attorney, Agent, or Firm* — Jason P. Mueller; FisherBroyles, LLP

(57) ABSTRACT

Embodiments of the present disclosure provide devices, systems and methods for monitoring anti-corrosion efforts including the efficacy of cathodic protection systems. Embodiments of the present disclosure provide devices, systems and methods for remote cell cathodic protection (CP) survey data acquisition to sense, display, and record CP survey voltage potential measurements as well as global positioning system and navigation data. Embodiments of the present disclosure provide improvements in terms reduced noise and improved signal quality through the use of copper conductors that connect electrochemical reference cells (i.e., electrodes) to measuring apparatus. Further, improved signal detection is provided by embodiments including reference electrodes that may be placed further (e.g., up to 1000 feet) from a surface vessel than are found in conventional system. Disclosed embodiments also provide highly precise spatial mapping of CP potentials (e.g., to within 0.5 mm spatial resolution in 1000 feet of depth).

20 Claims, 11 Drawing Sheets

(56) References Cited

U.S. PATENT DOCUMENTS

| | | | | |
|---|---|---|---|---|
| 6,243,483 B1* | 6/2001 | Petrou | ............... | F17D 5/00 |
| | | | | 348/144 |
| 2011/0238347 A1* | 9/2011 | Gemperli | ............... | C23F 13/04 |
| | | | | 702/65 |
| 2016/0291156 A1* | 10/2016 | Hjelmstad | ............... | G01S 7/4911 |
| 2018/0290717 A1* | 10/2018 | Byrd | ............... | B63C 11/52 |

* cited by examiner

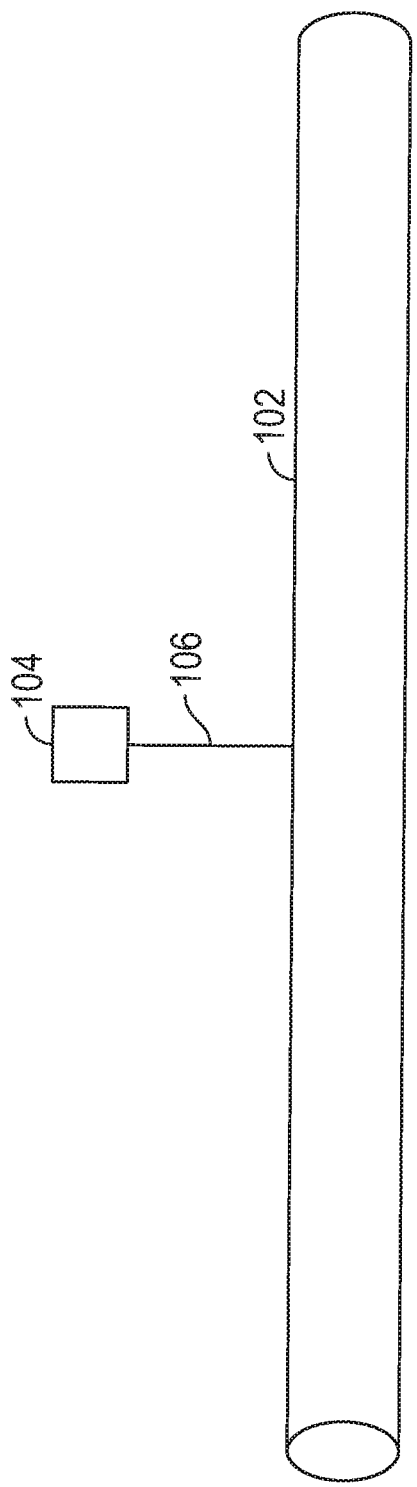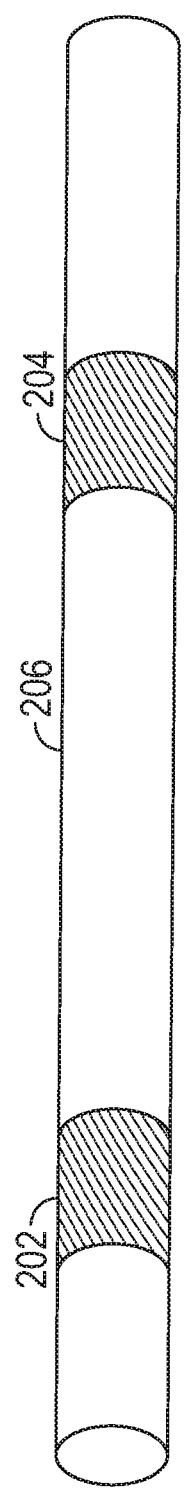
FIG. 1
FIG. 2

SYSTEMS, APPARATUSES, AND METHODS TO ASSESS CORROSION PREVENTION

CROSS-REFERENCE TO RELATED APPLICATIONS

This application claims the benefit of U.S. Provisional Patent Application No. 62/522,468, filed Jun. 20, 2017, which is incorporated here by reference in its entirety.

BRIEF DESCRIPTION OF THE DRAWINGS

FIG. 1 shows a system configured to provide cathodic protection to an undersea pipeline, according to an example embodiment of the present invention.

FIG. 2 shows a system configured to provide cathodic protection to an undersea pipeline, according to an example embodiment of the present invention.

DETAILED DESCRIPTION

Figure 3:
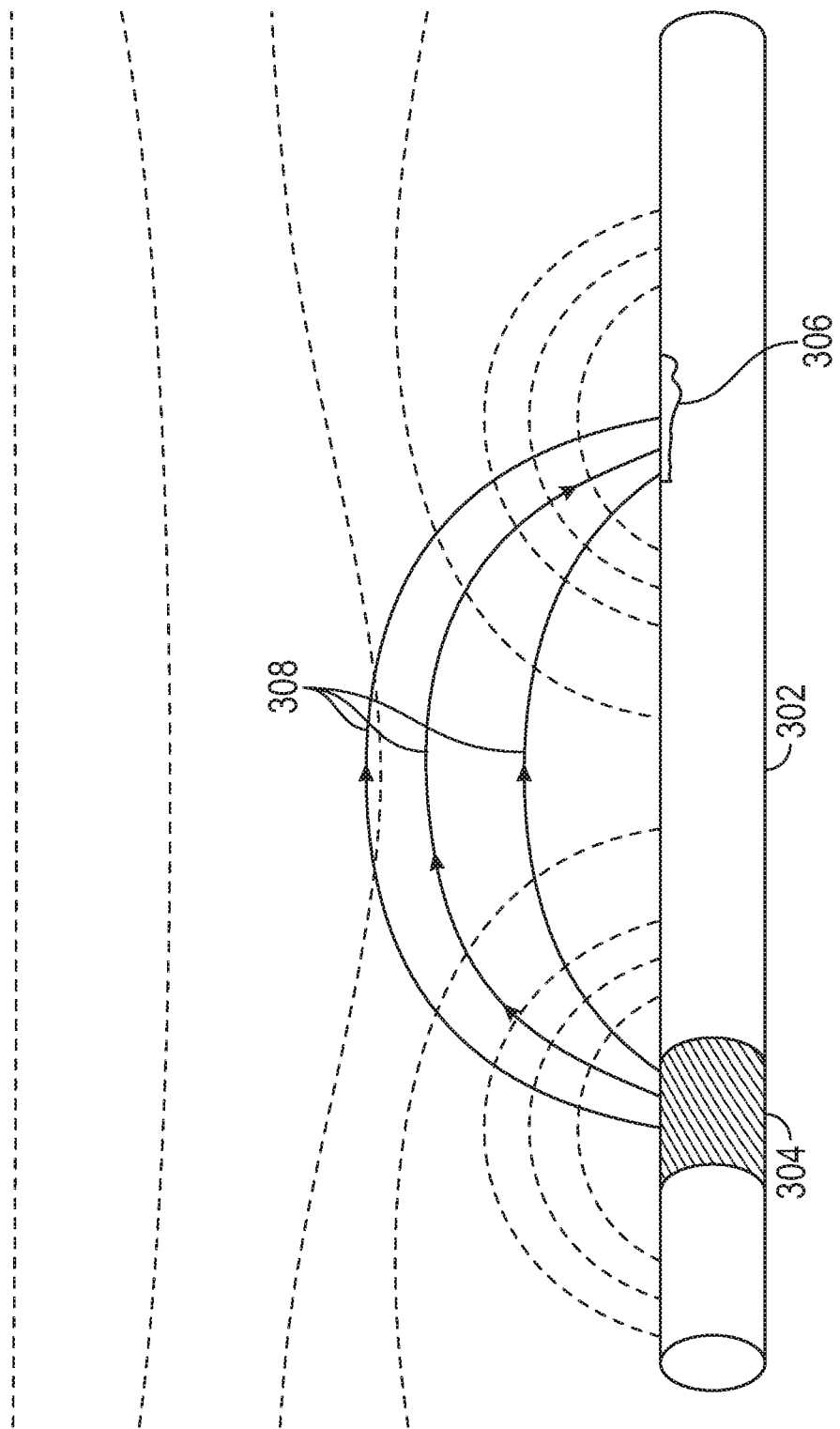
FIG. 3 shows an example distribution of electrochemical potentials near a surface of a pipeline that is provided with cathodic protection, according to an example embodiment of the present invention.

Industrial activity in the oil and gas industry involves the use offshore platforms and undersea pipelines. Subsea infrastructure must be constructed and maintained for many years despite threats from harsh subsea environments that promote corrosion and degradation of materials. In such environments, active anti-corrosion measures are employed to maintain integrity of metallic materials.

Embodiments of the present disclosure provide devices, systems and methods for monitoring and evaluating the efficacy of anti-corrosion efforts, including cathodic protection (CP) systems for materials used in subsea operations. Embodiments of the present disclosure provide devices, systems, and methods for data acquisition using remote cell CP survey systems configured to sense, display, and record CP survey voltage potential measurements. Embodiments of the present disclosure also provide systems including a global positioning system (GPS) and navigation data systems. Embodiments of the present disclosure provide systems for carrying out remote cell CP surveys using one or more remotely operated vehicles (ROV) that make use position data provided by GPS systems. GPS geolocation may be determined precisely using a plurality of tools including one or more orbital satellites, radar, SAM laser technology, and acoustics.

In certain embodiments, CP survey measurements and positioning data may be communicated to system software on a host PC, analyzed, recorded, and output to a display. In certain embodiments, CP survey measurements and positioning data may also be transmitted back to a CP survey system computer to be recorded and utilized in the creation of a pipeline profile upon completion of the survey. In certain embodiments, receipt of positioning data by the system software initiates a scan or CP survey, which measures voltage of a member under CP. The methodology disclosed herein assures the CP survey measurement acquired during scanning directly correlates to position data.

Embodiments of the present disclosure provide data collection hardware for collection of CP survey measurements and positioning data. Data collection hardware may include electronic hardware, software, subsea CP equipment, and a supporting wireline unit and work class remotely operated vehicle (WROV or ROV). Embodiments of the present disclosure also provide a high resolution, high-impedance digital multi-meter (DMM) with an integrated multiplexer to sense the voltage potentials of target members under CP using at least a CP stab probe, close cells, and remote reference cells. In certain embodiments, the DMM transmits these values to the data acquisition software running on a host PC. In certain embodiments, the DMM may be operationally connected to the subsea CP stab/close cell assembly through a wireline unit. In certain embodiments, the DMM may also be operationally connected to the remote reference cell deployed directly overboard by hand, e.g. direct connection. In certain embodiments, a multiplexer may rapidly switch the connections of the target members, for example, underwater pipeline, under CP to the terminals of the DMM such that the voltage potentials between target data points can be measured and displayed, as well as to allow for redundancy for close and remote cells.

Embodiments of the present disclosure provide a software system including data acquisition software to control CP voltage data collection, transmission and processing of CP voltage data. Data acquisition software may collect, communicate/transmit, record, analyze and output data acquired from the DMM, navigation/GPS system and CP survey. Software systems may also provide control for other aspects of CP surveys including controlling one or more ROVs.

Embodiments of the present disclosure provide improvements in terms reduced noise and improved signal quality through the use of copper (Cu) conductors that connect electrochemical reference cells (i.e., electrodes) to measuring apparatus. Further, improved signal detection is provided by embodiments including reference electrodes that may be placed further from a surface vessel than are found in conventional system. For example, according to an embodiment of the present disclosure, reference electrodes may be placed up to 1000 feet away from a surface vessel and away from other electrodes employed in CP surveys of submerged pipelines down to three miles of depth. Disclosed embodiments also provide highly precise spatial mapping of CP potentials (e.g., to within 0.5 mm spatial resolution in 1000 feet of depth).

FIG. 1 shows a configuration that provides cathodic protection to an undersea pipeline, according to an example embodiment of the present invention. Cathodic protection (CP) is a technique that controls corrosion of a metal by making the metal a cathode in an electrochemical cell. In this example, a steel pipe 102 may be electrically connected to an anode 104 by an electrical connection 106. In this configuration, the anode 104 corrodes rather than the steel pipe 102. The anode 104 may be provided in many forms. For example, a thin coating on the metal to be protected may serve as the anode. Typical corrosion protection coatings may include an aluminum alloy.

FIG. 2 shows a configuration that provides cathodic protection to an undersea pipeline, according to an example embodiment of the present invention. In this example, anodes 202 and 204 may be provided in the form of an aluminum alloy cylindrical structures. Such cylindrical anode structures 202 and 204 are often called "bracelet anodes" which surround a subsea pipe or conduit. Bracelet anodes 202 and 204 may be configured to make a conductive electrical connection to the steel pipe 206 and thereby provide CP. For example, bracelet anodes 202 204 may make direct metallic contact with pipe 206 or may be configured to be electrically connected to pipe 206 through one or more separate electrical connectors (not shown).

Unprotected carbon steel exhibits an electrochemical potential of approximately −570 mV to −620 mV relative to a standard Ag/AgCl reference cell. The addition of anodes (e.g., anodes 202 and 204) causes the potential to shift to more negative potentials. The greater the potential shift toward increasingly negative potentials the greater the cathodic protection. In certain embodiments, the target potential may be about −800 mV for steel pipes in seawater. Target potentials between may range from −850 mV and −950 mV relative to a standard Ag/AgCl cell.

Anodes (e.g., anodes 202 and 206 of FIG. 2) only have a finite lifetime and eventually fail where deployed in a CP system. The lifetime of anodes 202 and 206 are determined by design considerations. However, while the life of an anode is finite, an anode may be designed to last twenty years or longer. Anodes gradually deteriorate as they age. The health (i.e., stability or degree of degradation) of a CP system may be monitored by monitoring the electrochemical potential near the surface of a pipe that is being protected by sacrificial anodes, as shown in FIG. 3, and described in greater detail below.

FIG. 3 shows electrochemical potentials near the surface of a pipeline that is provided with CP, according to an example embodiment of the present invention. In this example, a pipeline 302 may be provided with one or more bracelet anodes 304 that are configured to provide CP. A region of damage 306 is also shown in FIG. 3. In this example, the region of damage 306 may be a damaged portion of a galvanic coating (e.g., an aluminum alloy). Further, the region of damage 306 may include an exposed portion of unprotected steel. The difference in electrochemical potential between the anode 304, and the portion of damage 306, generates an electrochemical potential distribution, as shown in FIG. 3.

Near the anode 304 the potential may be close to −1020 mV and near the portion of damage 306 the potential may be near −950 mV. The gradient of the potential is a distribution of lines 308 that illustrate paths of electrical current that flow between anode 304 to the portion of damage 306. Electrical currents between anode 304 and the portion of damage 306 decrease with distance between the anode and the portion of damage. As such, anode 304 provides decreasing protection to the portion of damage 306 with increasing distance between anode 304 and the portion of damage 306. The electrochemical distribution shown in FIG. 3 illustrates that the health of a CP system may be monitored by measuring the electrochemical potential near a pipeline that is being protected.

Figure 4:
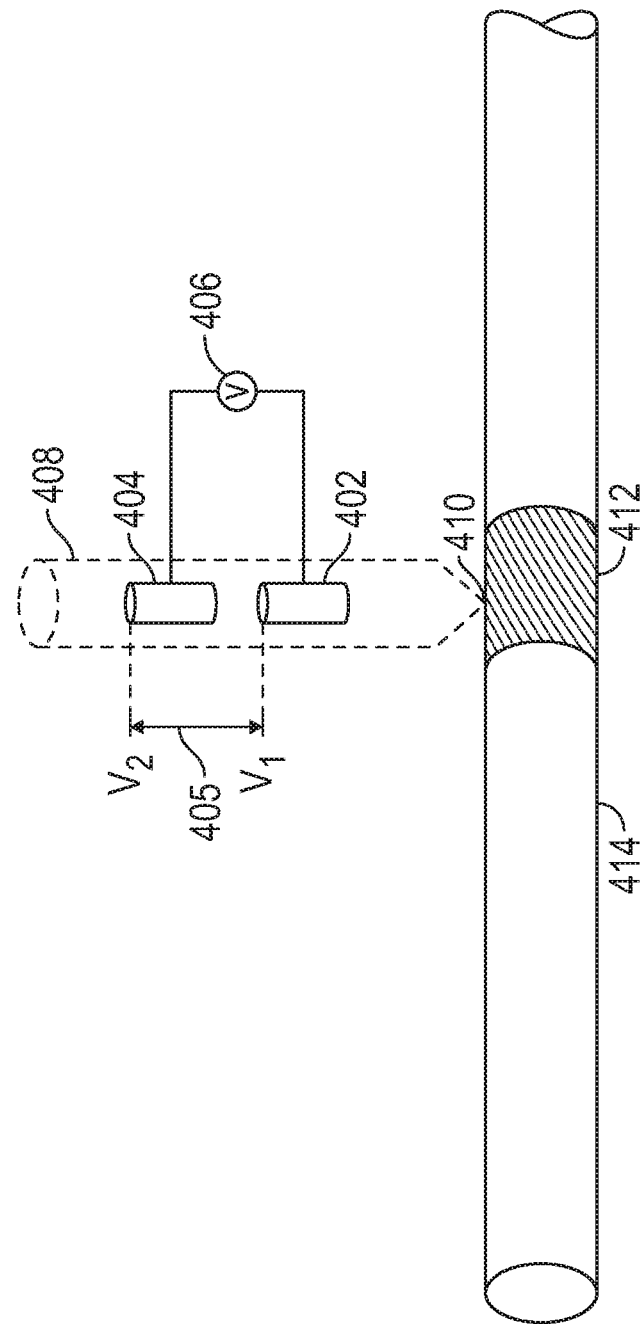
FIG. 4 shows a system configured to measure an electrochemical potential distribution, according to an example embodiment of the present invention.

FIG. 4 shows a configuration for measuring an electrochemical potential distribution, according to an example embodiment of the present invention. In this example, a first electrode 402 and a second electrode 404 may be configured to measure an electrochemical potential gradient. As shown in FIG. 3, the gradient 308 of the electrochemical potential determines the magnitude and direction of electrical currents provided by an anode (e.g., anode 304 in FIG. 3). In this example, electrodes 402 and 404 may be configured to be separated by a predetermined distance 405. The gradient of the electrochemical potential may be determined based on a measured potential difference 406 between electrodes 402 and 404, and the predetermined distance 405 between electrodes 402 and 404. Electrodes 402 and 404 may be configured within a housing 408 to form an integrated probe. A "stab probe" is an example of such an integrated probe that may be configured with a sharp conducting portion 410 that may be configured to make contact with an anode 412 or with a surface of a pipeline 414. In other embodiments, the distance 405 between electrodes 402 and 404 may be variable and have a user-selectable configuration.

Figure 5:
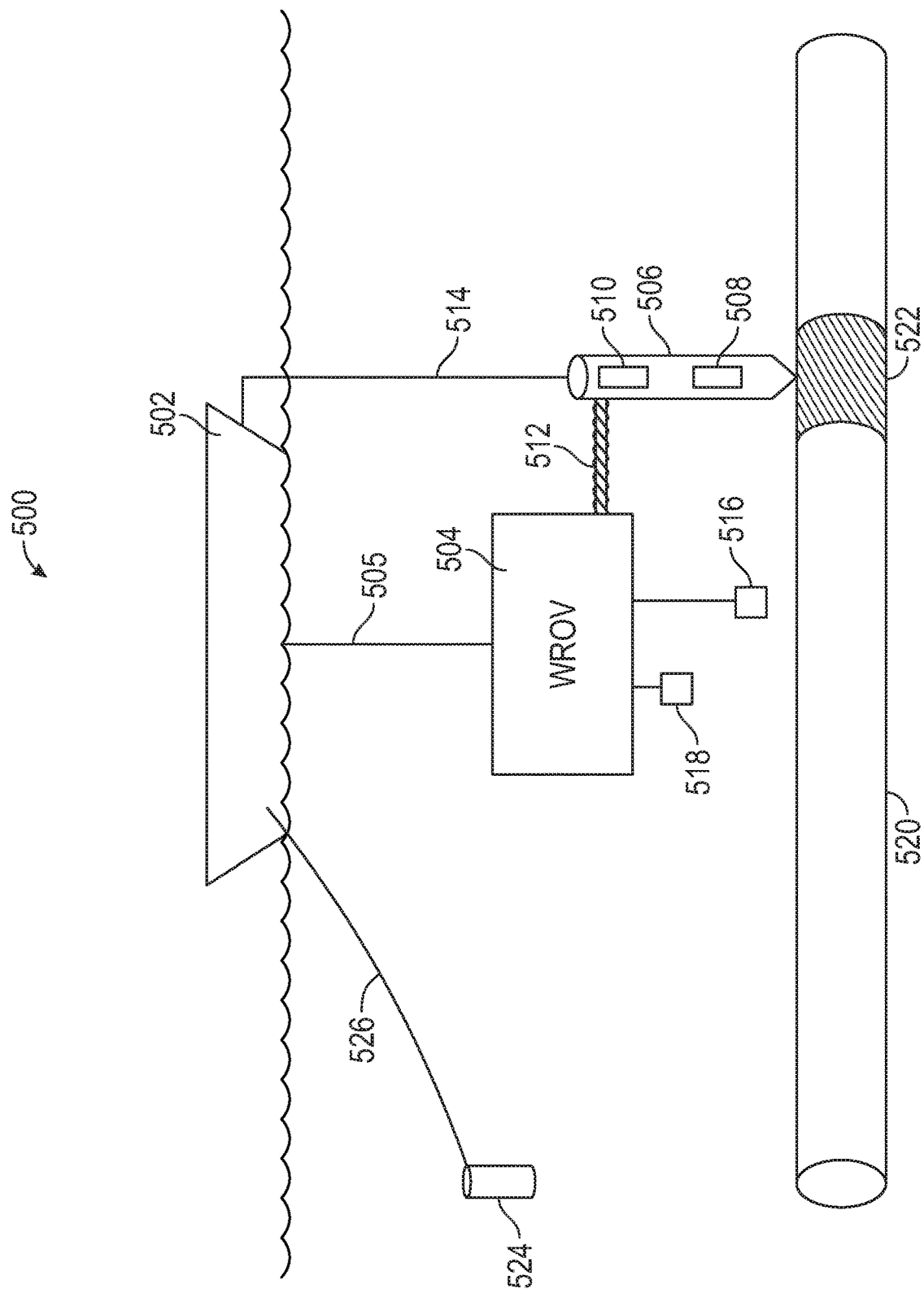
FIG. 5 illustrates a system for measuring an electrochemical potential near an undersea pipeline, according to an example embodiment of the present invention.

FIG. 5 illustrates a system 500 for measuring an electrochemical potential near an undersea pipeline, according to an example embodiment of the present invention. In this example, a surface vessel 502 is operationally connected to a WROV 504. The WROV 504 may be connected to the surface vessel 502 by one or more connections 505. Connection 505 may provide an electrical, an optical, and/or a mechanical connection between surface vessel 502 and WROV 504. In one embodiment, connection 505 may be provided by a winch wire which may be configured to provide mechanical and electrical connectivity.

The WROV 504 may further be operationally coupled to one or more stab probes 506. In this this example, the stab probe 506 may further include a first electrode 508 and a second electrode 510. The stab probe 506 may be connected to the WROV with one or more connections 512. Connection 512 may provide an electrical, an optical, and/or a mechanical connection between the WROV 504 and the stab probe 506. In some embodiments, stab probe 506 may include a separate connection 514 to the surface vessel 502. In further embodiments, the WROV 504 may be further connected to one or more electrodes 516 and 518. As shown in FIG. 5 electrodes 516 and 518 may be positioned relatively close to pipeline 520. As described above (e.g., with reference to FIGS. 2 to 4), pipeline 520 may be provided with one or more bracelet anodes 522 that provide CP.

System 500 may further include a reference electrode 524 that may be positioned remotely from pipeline 520. Reference electrode 524 may operationally connected to surface vessel 502 via a connection 526. Connection 526 may provide a mechanical, an electrical, and/or a mechanical connection between reference electrode 524 and surface vessel 502.

Reference electrode 524 may be used to establish a reference electrochemical potential. Upon establishment of a reference potential given by the potential of the reference electrode 524, various relative potentials may be determined and monitored. For example, V1 may be defined as the potential difference between one or more close electrodes/probes (e.g., close electrodes 516 and/or 518) and the stab probe 506, V2 may be defined as the potential difference between the stab probe 506 and the remote reference electrode/probe 524, and V3 may be defined as the potential difference between one or more close electrodes (e.g., close electrodes 516 and/or 518) and the remote reference electrode 524. The health of a CP protected pipeline 520 may be monitored based on monitoring measurements of V1, V2, and V3 as functions of position at various points along the pipeline 520.

Figure 6:
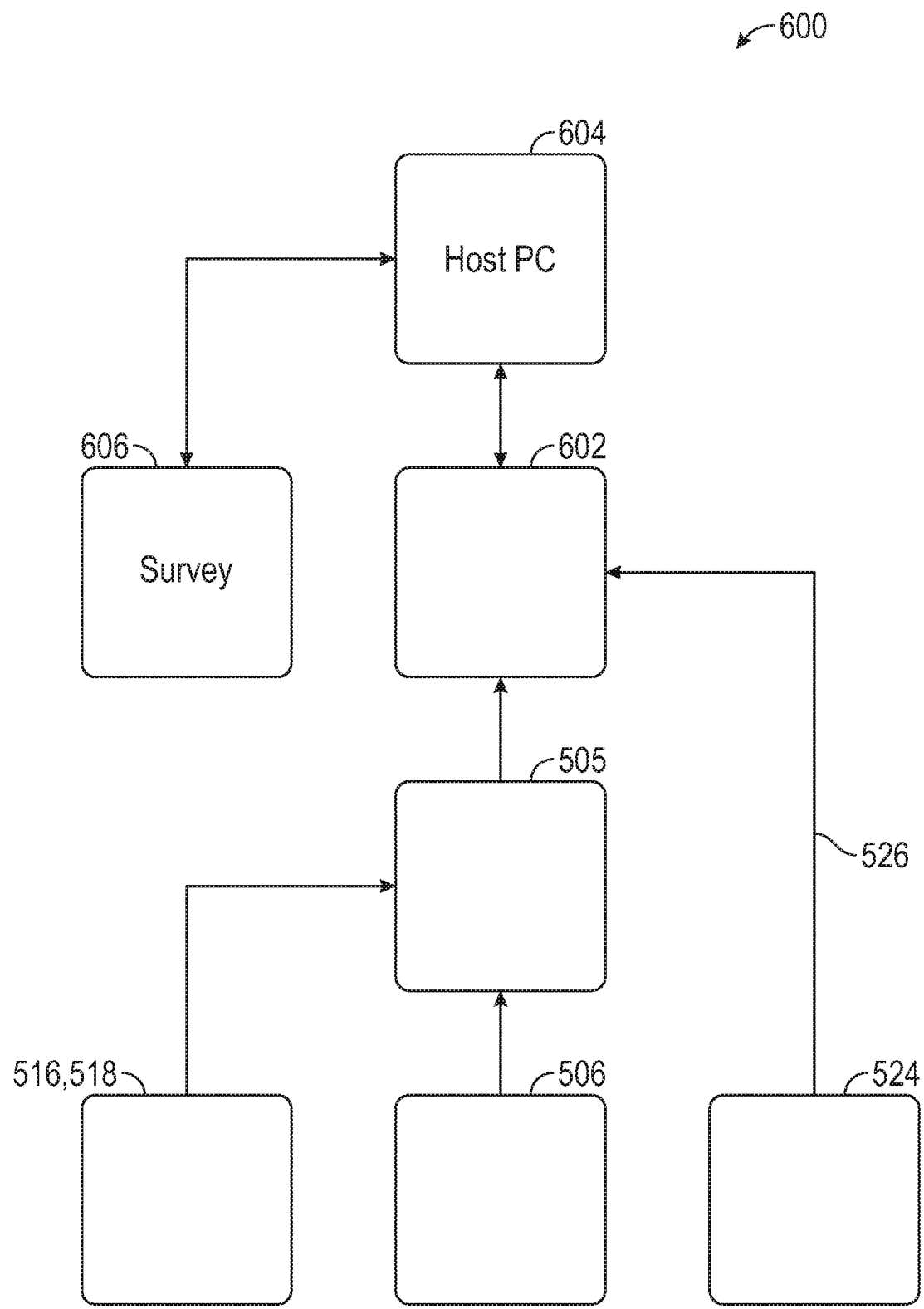
FIG. 6 shows a schematic of a system implemented with a surface vessel, according to an exemplary embodiment of the present disclosure.

FIG. 6 shows a schematic of a system 600 implemented with a surface vessel 502 (e.g., see FIG. 5), according to an exemplary embodiment of the present disclosure. As described above (e.g., with reference to FIG. 5), system 600 may include a stab probe 506, one or more electrodes 516 and 518 near the surface of a pipeline, and a reference electrode 524. Reference electrode 524 may be connected to surface vessel 502 via a connection 526. Stab probe 506, and one or more near electrodes 516 and 518 may be connected to the surface vessel 502 via connection 505. Connections 505 and 526 may be connected to an analytical system 602 on the surface vessel 502. In an embodiment, analytical system 602 may be DMM. Analytical system 602 may further be connected to a computing device 604, such as a personal computer, a smart phone, etc. Analytical system 602 and computing device 604 may compute and analyze the various measured potentials V1, V2, V3, as well as the potential of the pipeline 502 determined by stab probe 506. Analytical system 602 and computing device may then perform operations to carry out a survey 606 of CP potentials of a pipeline being monitored.

Figure 7:
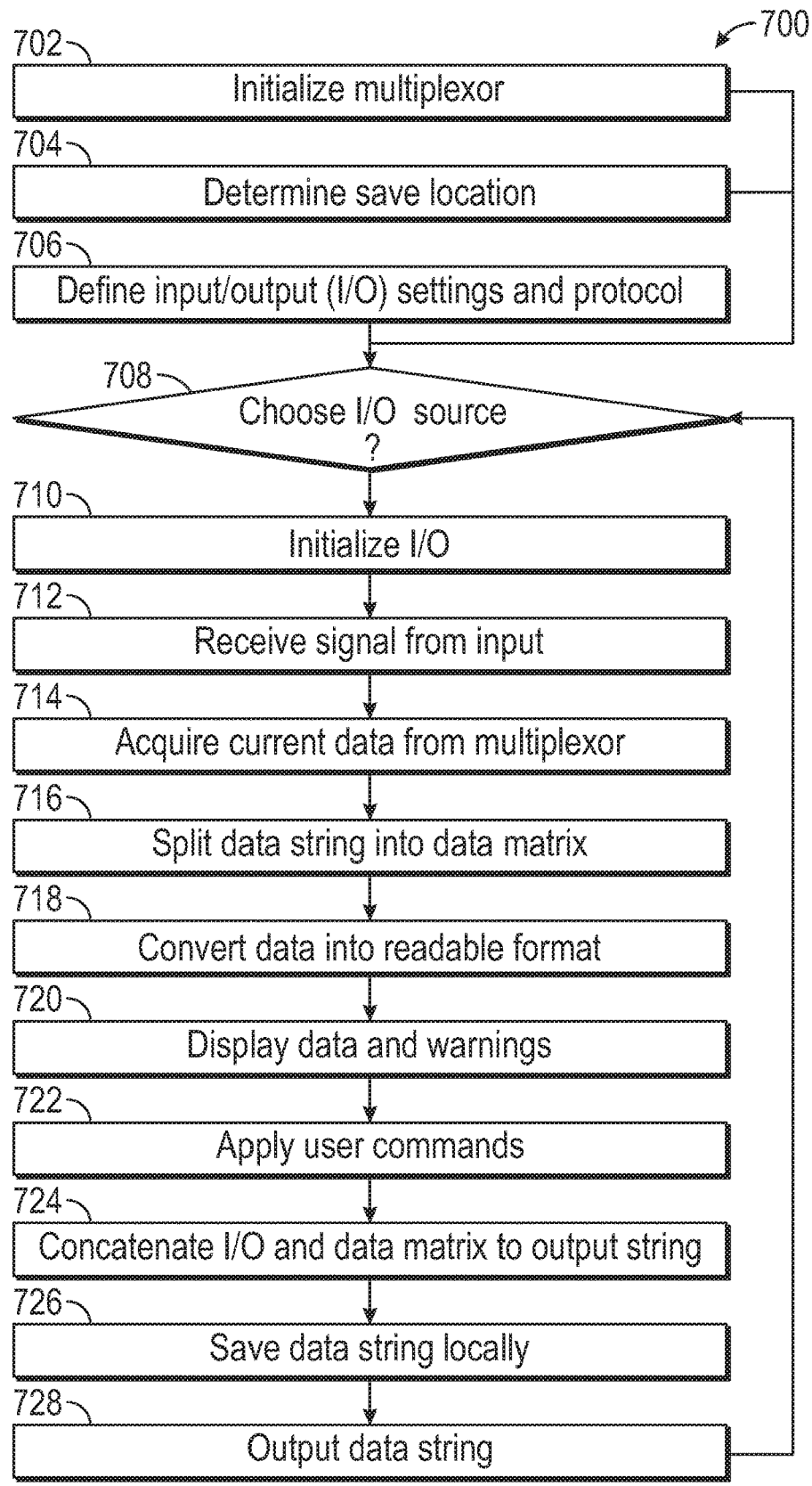
FIG. 7 is a flow chart illustrating software processes, operational flow, and data flow, according to an exemplary embodiment of the present disclosure.

FIG. 7 is a flow chart 700 illustrating software processes, operational flow, and data flow, according to an exemplary embodiment of the present disclosure. In certain embodiments, the methods and processes disclosed herein include sending an initialization sequence 702 or initialization commands to a DMM, creating a save location 704 for the local data container and defining the input/output (I/O) protocol 706 and settings for the externally collected survey data.

In certain embodiments, the initialization commands 702 for the DMM are determined by the unit chosen, for example, by a user. In certain embodiments, initialization commands may include: declaration of channels 708 and initialization 710 of channels to scan during multiplexing, scan rate, data precision and collection parameters such as impedance, operating ranges, noise filtering and self-averaged data sets.

In certain embodiments, once initialization is complete, the DMM may cycle continuously. In other embodiments, the DMM may not cycle continuously after initialization is complete. DMM cycling may be determined by specific protocols selected within the data acquisition software. In certain embodiments, DMM cycling produces survey input/output (I/O) data that is communicated to the system software, for example, acquisition software. In certain embodiments, the system software executes its remaining function once a data string containing position and other relevant survey data is received on the survey I/O. The methodology disclosed herein provides system software having a refresh rate that may be entirely dynamic and driven by the survey I/O.

In certain embodiments, survey data may be communicated to system software. When survey data is received 712 by system software, the survey data string, that is, data received 714 from the DMM, may be processed or analyzed 716. In certain embodiments, the data string may be converted 718 from a text string to an array of floating point numbers which include V1; the potential between the close probe and the stab probe, V2; the potential between the stab probe and the remote probe and V3; and the potential between the close probe and the stab probe. The values may be converted to the display unit (e.g., millivolts) and displayed 720.

Further data processing operations may be based on user commands 722, as follows. In certain embodiments, a plurality of survey data may be joined or concatenated 724 into a final data string 726 that may be saved, stored or output 728 in a plurality of file types, for example, .csv file format. In certain embodiments, the concatenated data string may also be broadcast via the survey I/O.

FIGS. 8 to 11 illustrate the graphic user interface (GUI) used to setup software and display data. In certain embodiments, the system software employs a GUI to facilitate use of the software by a user. A setup tab may be used to select the communication ports and end string character, as well as to allow the operator to select the standard or "backup" cells used. A measurement tab may be used for all other operations. In certain embodiments, the selections among the setup tab may be preset by file allocation table (FAT), and therefore may not require adjustment by the user.

Figure 8:
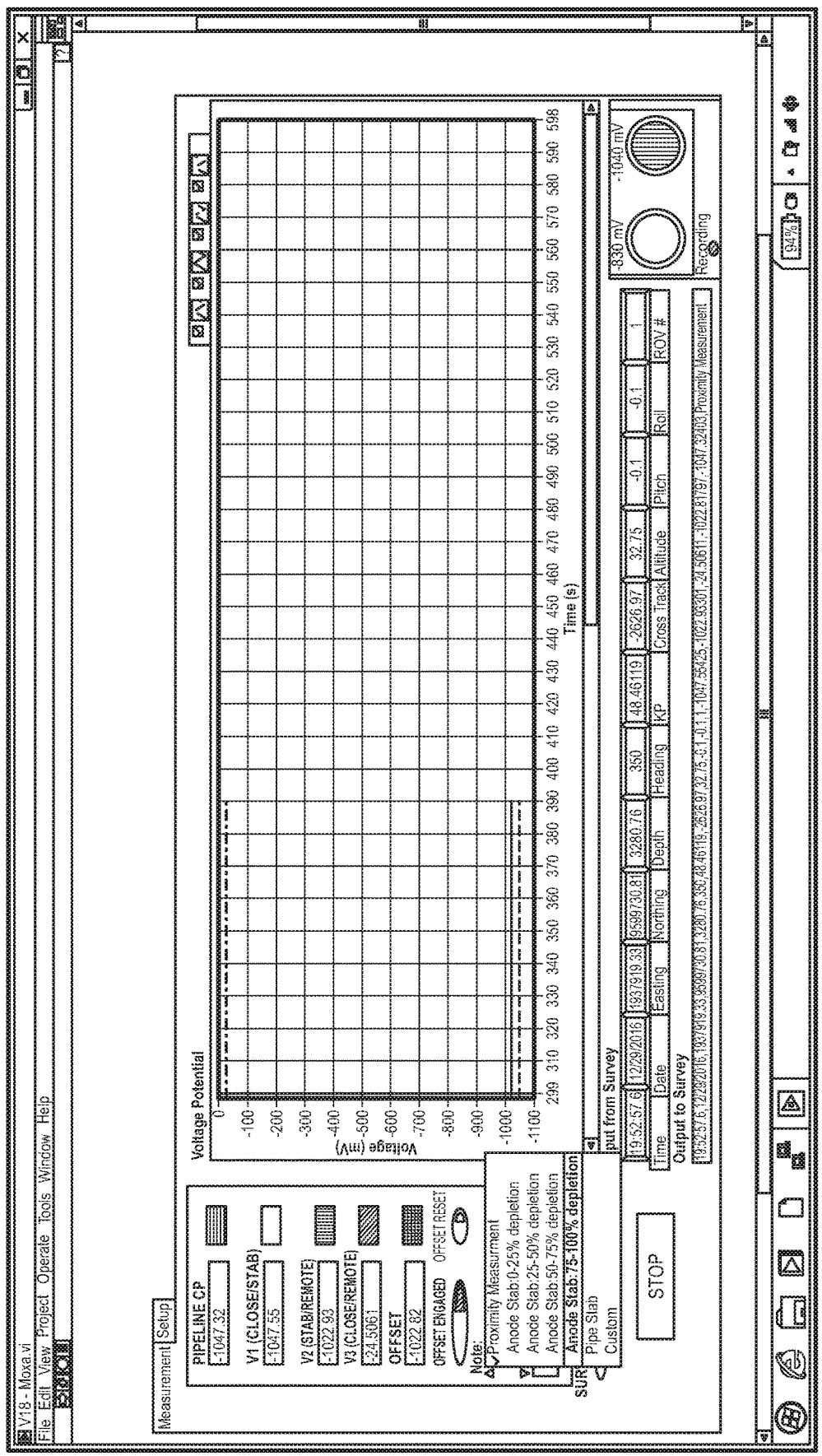
FIG. 8 shows a GUI display of setup page, according to an exemplary embodiment of the present disclosure.

Embodiments of the present disclosure provide devices which may be connected using a plurality of connectors. In certain embodiments, the system software GUI may allow a user to connect to the DMM using a general purpose interface bus (GPIB) and a serial connection using a GUI and/or input dropdown menus. All channels may be scanned and measured by the DMM at a frequency of 10 Hz, for example. Other scanning frequencies may be employed in other embodiments. The measurements and calculated values are recorded when a continuous or fixed position is received, or when the fix button is actuated by the operator. The transmission rate frequency is depth dependent and can range from 0.1 to 3 seconds. FIG. 8 shows input options. The baud rate and end character along with the data channels are also set on the setup page. The data channels may consist of a redundant set of multiple channels (e.g., three channels) that can be changed on the fly in the event of failure of the DMM.

Figure 9:
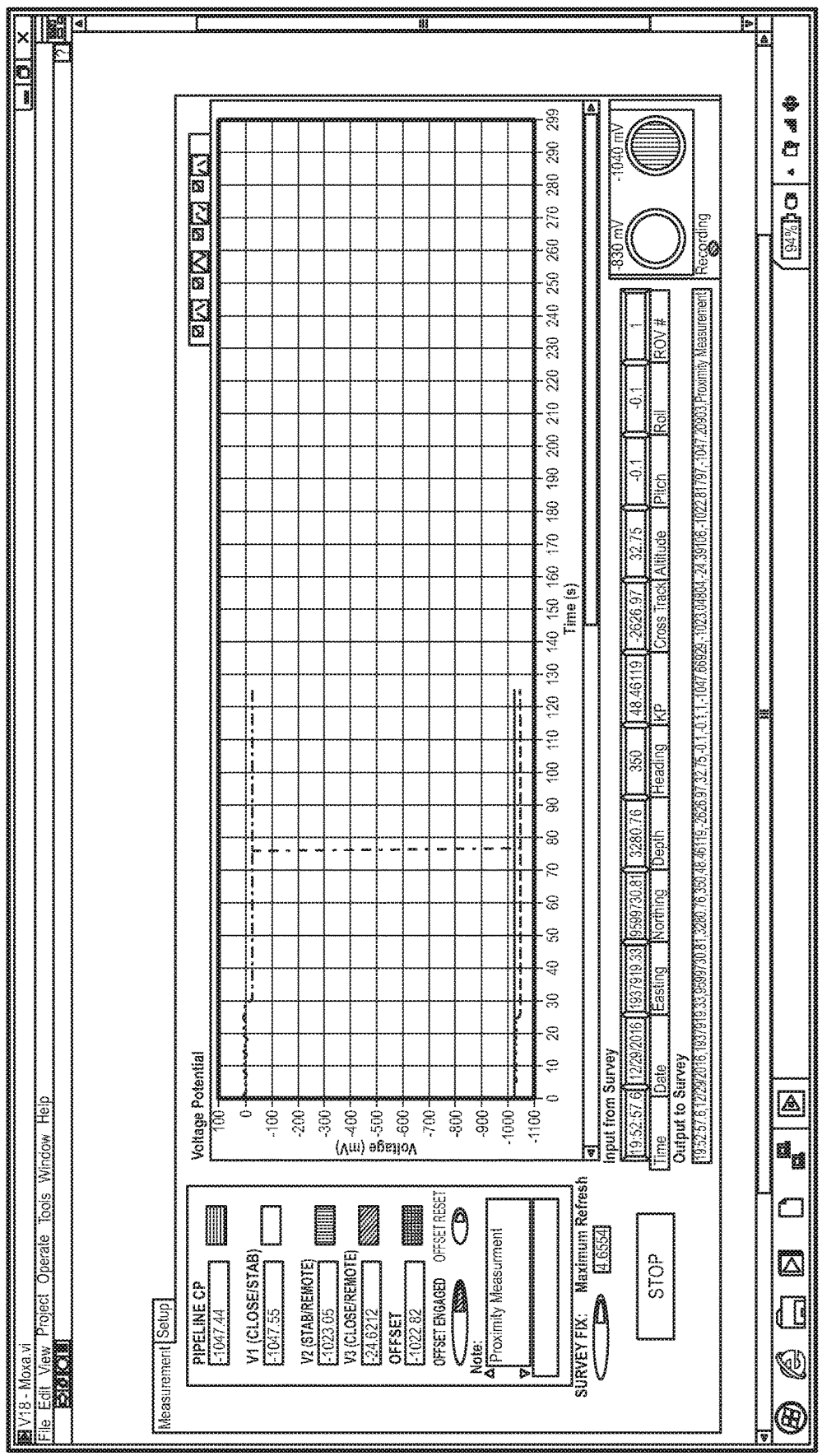
FIG. 9 shows a GUI display including system measurements, according to an exemplary embodiment of the present disclosure.

FIG. 9 illustrates a measurement tab of the GUI, which may be used during operation of the system disclosed herein. The measurement tab consists of a GUI including a data display having measurements and calculated voltage potentials, a time history graph of the same data, alarm history data, a display of data received from the survey, data sent to the survey, and an area for taking note of the integrity of the anode.

Embodiments of the present disclosure provide system software that may be used for processing and filtering of collected data. In certain embodiments of the present disclosure, the data acquisition process may be partially or fully automated to include a plurality of diagnostic information about the status of the system. In certain embodiments, the status or health of the anodes may be automatically collected by the data acquisition software by combining the known location of the anodes (from previous surveys), the known cathodic potential (from previous surveys) and the current measured data. The difference between voltage potentials indicates the current health of the anode.

Embodiments of the present disclosure provide system software which may be used for remote control operation of the ROV. Embodiments of the present disclosure provide system software that may be used for autonomous operation of the ROV. System software may allow user control to be altered such that system control may be executed remotely. Collected data may be transmitted or communicated from a vessel to a remote server for storage, analysis, and distribution to a remote terminal. The remote server may also be capable of sending commands to the data acquisition unit on the vessel.

As shown in FIGS. 8 to 11, the GUI provided in various embodiments of the present disclosure includes a system capable of displaying a plurality of variables including: pipeline CP, voltage V1 (Close/Stab); voltage V2 (Stab/Remote); voltage V3 (close/Remote); and Offset values. In addition, the GUI interface may also provide survey input and output data.

Embodiments of the present disclosure provide systems, apparatuses, and methods including: electronic hardware, software, subsea CP equipment and the supporting wireline unit and WROV. A high resolution, high-impedance digital multi-meter (DMM) with an integrated multiplexer senses the voltage potentials of the CP stab probe, close cells, and remote reference cells. The DMM transmits these values to the data acquisition software on the host PC. The DMM is connected to the subsea CP stab/close cell assembly through the wireline unit. The DMM is also directly connected to the remote reference cell, which is deployed directly overboard by hand. The multiplexer rapidly switches the connections of the sensed devices to the terminals of the DMM such that the voltage potentials between devices can be measured and displayed, as well as to allow for redundancy of close and remote cells. The system data acquisition software as disclosed herein displays and records the data acquired from the DMM and survey computer.

In certain embodiments of the present disclosure, measures may be taken to overcome electrometric interference (EMI) in order to improve signal detection and quality. EMI energy may enter wherever there is an impedance mismatch or discontinuity in a system. For example, EMI energy may enter a system at an interface where cables carrying sensitive analog signals are connected to PC boards, and through power supply leads. Improperly connected cables or poor supply filtering schemes may also produce interference. To overcome EMI, system modifications may be in order. For example, system changes may include transmitting signals in differential form; amplifying signals to higher levels for improved S/N; converting signals into currents for transmission; and converting signals directly into digital form.

Crosstalk is a common form of interference. In the vicinity of the noise source, that is, near-field, interference is not transmitted as an electromagnetic wave, and the term crosstalk may apply to either inductively or capacitively coupled signals. In certain embodiments of the present disclosure, steps may be taken to eliminate capacitance-coupled interference, including: reducing the level of high dV/dt noise sources; using proper grounding schemes for cable shields; reducing stray capacitance; equalizing input lead lengths; keeping traces short; using signal-ground signal-routing schemes; and using grounded conductive Faraday shields to protect against electric fields.

In further embodiments of the present disclosure, the apparatus and system may be configured to overcome issues with low voltage potentials sensed by the system, which may also be exacerbated when combined with the long length of conductors required to execute a direct wired subsea CP survey, which are inherently vulnerable to electromagnetic interference and other electronic interference (noise).

According to an embodiment, the survey computer transmits the following data for both continuous position and "anode fix" modes. This data includes:

| Field | Notes |
|---|---|
| Time | |
| Date | US Format (M/D/Y) |
| Easting | Meters or US Feet |
| Northing | Meters or US Feet |
| Depth | Meters or US Feet |
| Heading | True Degrees |
| KP | Kilometers. Taken from vessel's primary line |
| Cross track | Meters or US Feet. Taken from vessel's primary line |
| Altitude | Meters or US Feet. Taken from vessel's primary line |
| Pitch | Degrees. Taken from vessel's primary pitch/roll device |
| Roll | Degrees. Taken from vessel's primary pitch/roll device |
| Vehicle Number | Numerical index from the configuration dialog. 1-based |

The survey computer provides the above data at the rate at which it is acquired (e.g., 0.1 to 3 seconds depending on water depth). Although the system CPSS software displays values for V1 and V2 between anodes, it is understood that these measurements do not provide an indication of CP when the stab probe is not in contact with the pipeline. In other versions of the software, V1 and V2 remain constant in between stabs (i.e., appear on the screen as step functions), and represent potentials measured at the last stab location.

The output from the system is the concatenated data from the GPS computer with the CP survey voltage potentials and operator comments. The data may also be provided for the video overlay using the ending character setting and survey string length display on the setup tab and mirrored to the survey computer port.

According to an embodiment, all required software may be installed on the host PC before deployment. A full backup and restoration point may be stored at that time. In the event of a catastrophic computer failure, a USB drive may be provided containing all required software. A GUI may be used to setup software and display data. The setup tab selects the communication ports and end string character, as well as allowing the operator to select the standard or "backup" cells used. The measurement tab is used for all other operations. The selections for the setup tab are typically preset during FAT and do not require adjustment.

FIGS. 8 and 9 provide exemplary embodiments of the system software measurement tab. The software measurement tab may include the following. Displayed values may include values in millivolts of each measured voltage and pipeline CP is shown. A graph of time dependent (i.e., trended) values of voltage potentials may be displayed. The millivolt scale can be changed by the user by double clicking the scale. An offset value may be selected and set by a user. The offset value is defined as the user-selected value for V2 which should be updated each mile or less by actuating the "update offset" button. A user selected note (i.e., comments, etc.) may be included on each scan. The note can be selected from a list of predetermined options or entered in the text field below if "custom" is selected. A "survey fix button" may also be provided. When this button is activated it causes the system to enter into "anode fix mode." A "stop" button may also be provided. When the stop button is activated it causes data acquisition to cease.

According to an embodiment, when "input from survey" mode is selected, raw data may be shown as received by system hardware from the various electrodes. In another mode (i.e., "output to survey 2") concatenated data transmitted by system hardware. When illuminated, an alarm light may indicate a reading outside the permissible minimum or maximum CP value. Proximity mode is the operation of measuring the CP potential of the pipeline when not at an anode. Anode mode is the operation of measuring the CP potential at an anode and with an increased accuracy anode fix provided by survey. During this mode, the anode fix number is recorded by the operator using the "custom" note feature. The anode fix number is provided by Survey. After recording the Fix number, the note can be changed to indicate relevant information such as anode depletion, etc.

Figure 10:
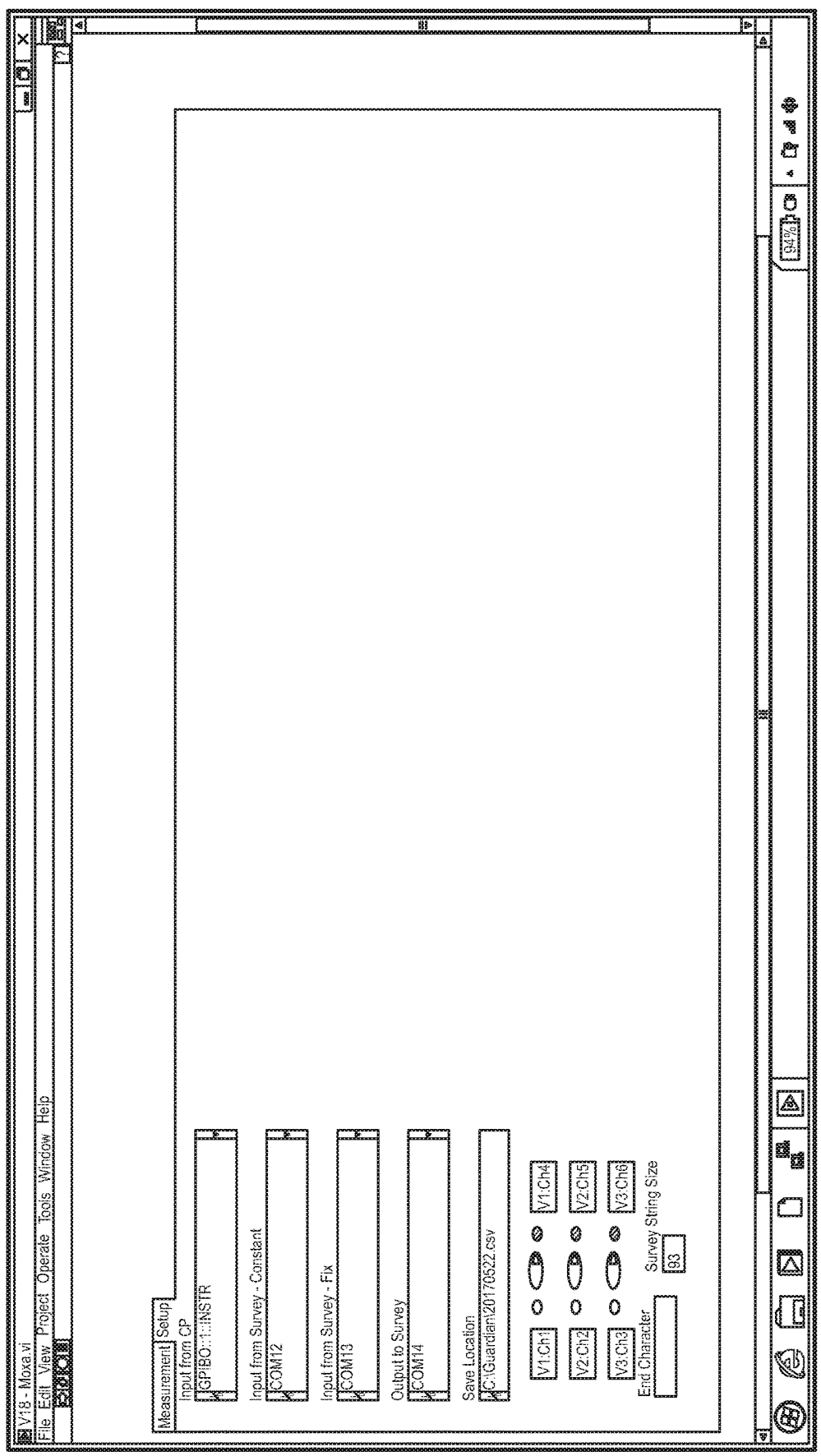
FIG. 10 shows a GUI display including measurement options selected from drop down menus, according to an exemplary embodiment of the present disclosure.
Figure 11:
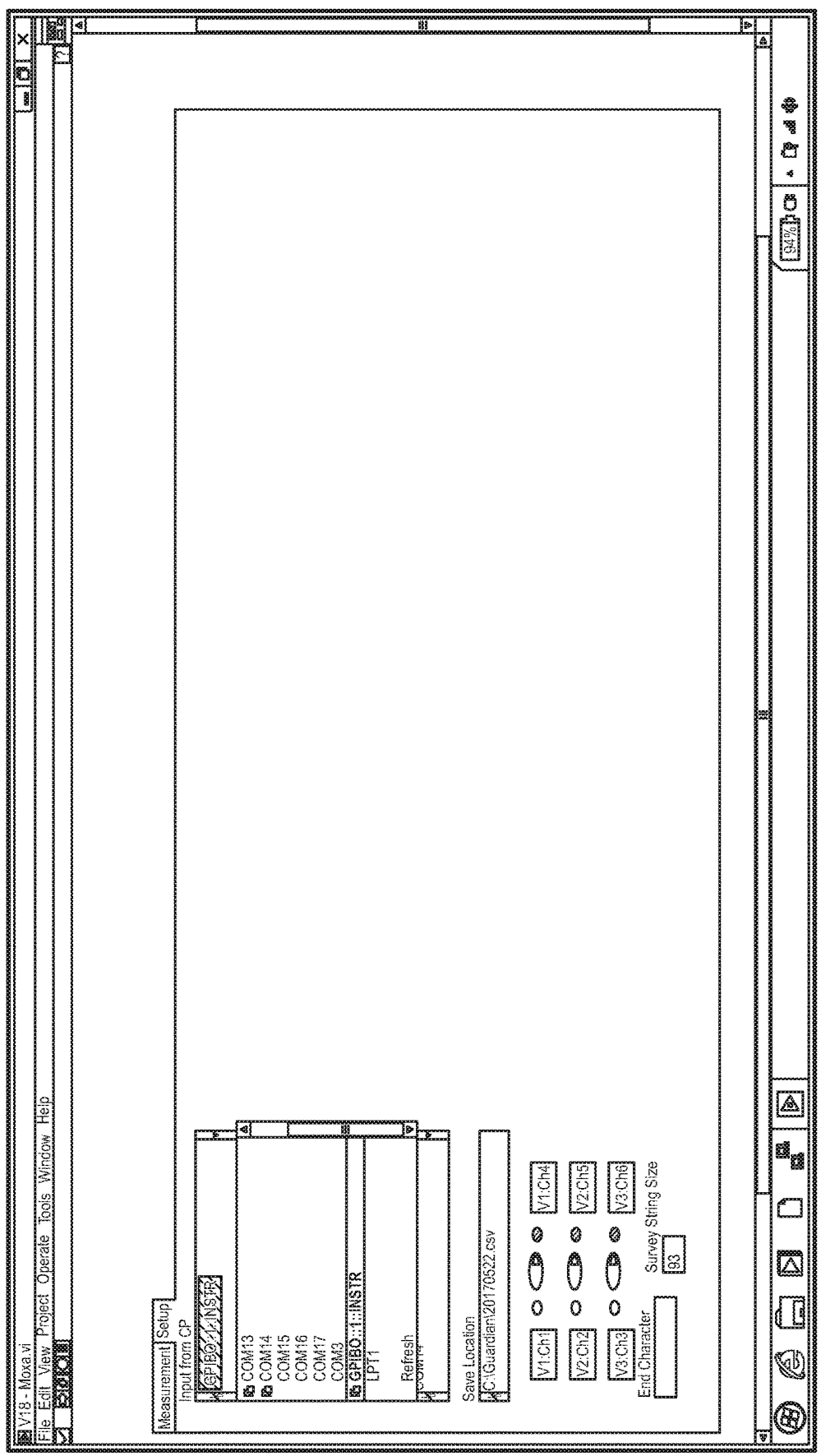
FIG. 11 shows a GUI display of setup page including drop down options, according to an exemplary embodiment of the present disclosure.

FIGS. 10 and 11 provide exemplary embodiments of the system software setup tab. The software setup tab may include the following. Functionality may be provided to configure input from sensors monitoring CP potentials. In this regard, the GPM connection to the DMM is configured in NIMAX™. All channels are scanned and measured by the DMM at a frequency of 10 Hz. The measurements and calculated values are recorded when a continuous or fix position is received, or when the fix button is actuated by the operator. The transmission rate frequency is depth dependent and can range from 0.1 to 3 seconds. Further functionality may be provided to allow a user to configure input from a survey computer. For example, an RS232 port on the system hardware serial server may be connected to a continuous data port on the survey computer.

Figure 12:
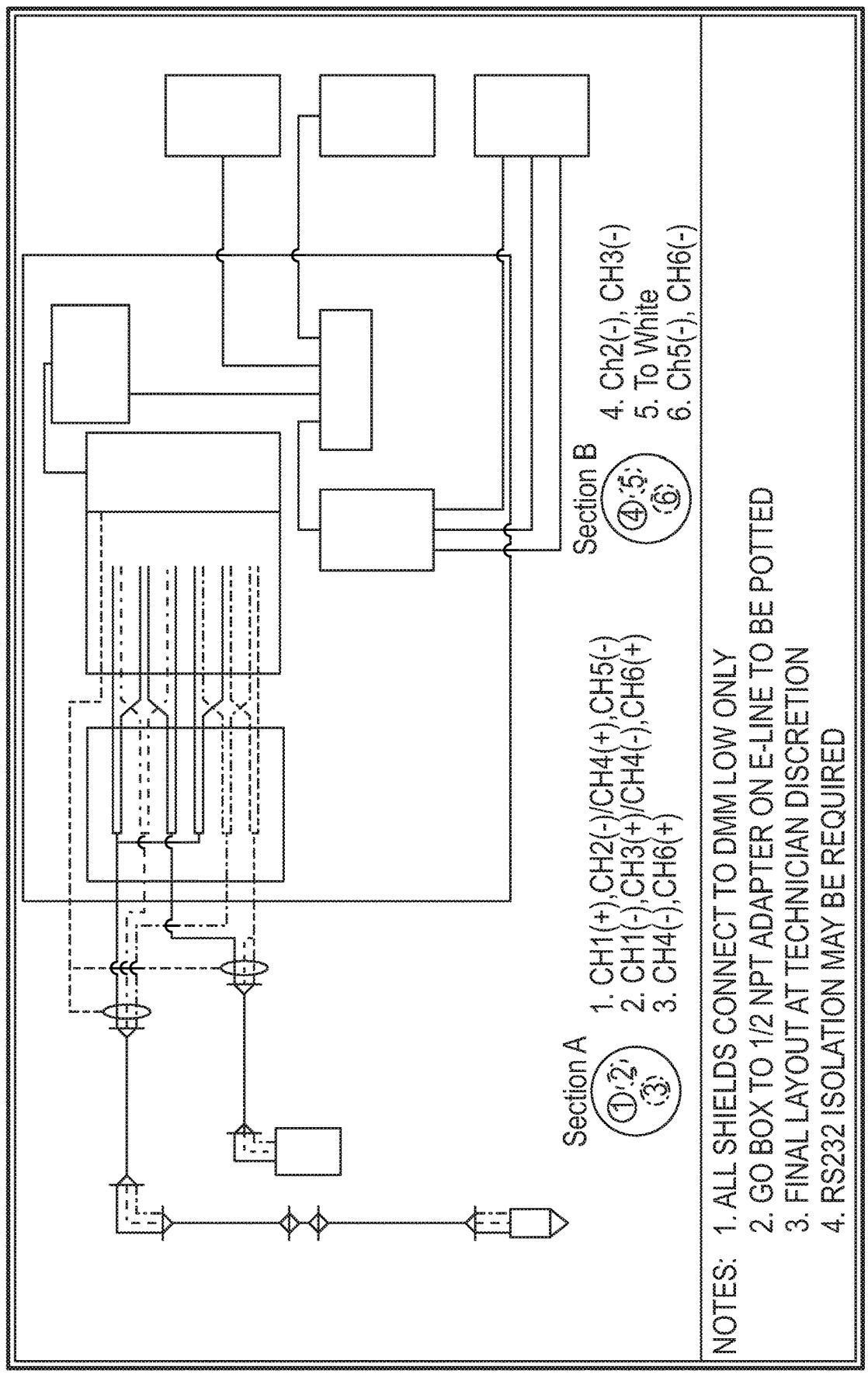
FIG. 12 shows a system wiring schematic, according to an exemplary embodiment of the present disclosure.

FIG. 12 shows a wiring diagram of an exemplary embodiment of the present disclosure for minimizing the impact of electronic noise. The following practices will minimize the impact of electronic noise on the system vulnerabilities. All shielding should only be connected to the low side of the DMM. The wireline unit should be electrically isolated from the host vessel (secured on shoring timbers or equivalent non-conductive material if possible). All electrical connections should be soldered. All components and cabling should be placed as far away from large electrical components/systems and their conductors as reasonably possible. The DMM input should be switched from rear to front in order to isolate the DMM, multiplexer and host PC from the subsea probe whenever the wireline winch is active. A continuity check and cross check should be used to verify all wiring since failure to do so may cause a catastrophic failure of the system.

Embodiments of the present disclosure may use any particularly wire type. Wiring materials having high conductivity and favorable mechanical properties at low, ambient, and elevated temperatures may be advantageous in various embodiments. Specifically, wiring materials that are resistant to large temperature variations may be useful in equipment deployed for sub-sea operations and exposed to extreme variations in surface versus sub-surface temperatures. In addition, characteristics of wiring materials for inclusion in various embodiments of the present disclosure include wiring materials that are easily fabricated or cast to shape and can be readily machined. Wiring materials that are resistant to oxidation and corrosion are also desirable, particularly in a marine environment in order to extend equipment service life by avoiding deterioration due to oxidation or corrosion over time. Copper wiring may be used throughout the wiring system in certain embodiments of the present disclosure. The connection between the e-line conductors and the bulkhead adapter may be implemented as a potted connection.

What is claimed is:

1. A method of conducting a survey of a member protected by a cathodic protection (CP) system, comprising:
    configuring a survey system using a graphical user interface (GUI) configured to receive input operational parameters;
    deploying the survey system, the survey system including a remotely operated vehicle (ROV), at least one digital multi-meter, a first electrode positioned at a first distance from a member protected by a cathodic protection system, a second electrode positioned at a second distance from the member protected by a cathodic protection system, wherein the second distance is greater than the first distance, and a third electrode configured to contact the member protected by the cathodic protection system at least at one known point;
    measuring cathodic protection (CP) potentials associated with the member protected by the CP system, the measured potentials including a potential difference between the first and second electrodes, between the first electrode and the third electrode, and between the second electrode and the third electrode;
    communicating measurements to a software system; and
    displaying CP potentials on the GUI.

2. The method of claim 1, wherein all measurements are collected and communicated to the software system and are further evaluated by the software system and all results are displayed in the GUI interface used to input operational parameters.

3. The method of claim 1, further comprising:
    measuring, using a global positioning system (GPS), spatial coordinates of the member protected by the cathodic protection system to generate a spatial mapping of CP potentials.

4. The method of claim 3, further comprising:
    generating the spatial mapping of CP potentials to have a resolution of ±0.5 mm in a depth of 1000 feet of water.

5. The method of claim 4, further comprising:
    generating the spatial mapping of CP potentials to be a three-dimensional mapping.

6. The method of claim 1, further comprising:
    measuring a reference potential using the second electrode that is at least 1000 feet away from a surface vessel and away from the first and third electrodes used to measure CP potentials.

7. The method of claim 1, further comprising:
    measuring CP potentials using the first, second and third electrodes that are electrically connected to the ROV, the digital multi-meter, and/or to a surface vessel using Cu connectors.

8. The method of claim 7, further comprising:
    measuring CP potentials using the first, second and third electrodes that are connected by up to 3000 meters of Cu connectors.

9. The method of claim 1, further comprising:
    measuring CP potentials on submerged structures at depths of up to three miles of water.

10. The method of claim 1, further comprising:
    measuring CP potentials at time intervals of about 0.001 seconds or greater.

11. A survey system that is configured to conduct a survey of a member protected by a cathodic protection system, comprising:
    an ROV;
    at least one digital multi-meter;
    a plurality of electrodes positioned and controlled by the ROV, the plurality of electrodes including:
        at least two reference electrodes including a first electrode positioned at a first distance from a member protected by a cathodic protection system, a second electrode positioned at a second distance from the member protected by a cathodic protection system, wherein the second distance is greater than the first distance; and a third electrode configured to contact the member protected by the cathodic protection system at least at one known point; and a GUI system configured to receive input operational parameters, wherein the system is configured to measure CP potentials associated with the member protected by the CP system, the measured potentials including a potential difference between the first and second electrodes, between the first electrode and the third electrode, and between the second electrode and the third electrode.

12. The system of claim 11, further comprising:

a non-transitory computer readable storage device comprising a software system, wherein the survey system is further configured to collect all measurements and to communicate the measurements to the software system that further evaluates the measurements and displays the results on the GUI.

13. The system of claim 11, further comprising:

a GPS, wherein the survey system is further configured to measure, using the GPS, spatial coordinates of the member protected by the cathodic protection system to generate a spatial mapping of CP potentials.

14. The system of claim 13, wherein the survey system is further configured to generate spatial mapping of CP potentials having a resolution of ±0.5 mm in a depth of 1000 feet of water.

15. The system of claim 14, wherein the survey system is further configured to generate a spatial mapping of CP potentials that is a three-dimensional mapping.

16. The system of claim 11, further comprising:

a surface vessel, wherein the survey system is further configured to measure a reference potential using the second electrode that is configured to be at least 1000 feet away from the surface vessel and away from the first and third electrodes used to measure CP potentials.

17. The system of claim 11, further comprising:

Cu connectors, wherein the survey system is further configured to measure CP potentials using the first, second and third electrodes that are electrically connected to the ROV, the digital multi-meter, and/or to a surface vessel by the Cu connectors.

18. The system of claim 17, wherein the survey system is further configured to measure CP potentials using the first, second and third electrodes that are connected by up to 3000 meters of Cu connectors.

19. The system of claim 11, wherein the survey system is further configured to measure CP potentials on submerged structures at depths of up to three miles of water.

20. The system of claim 11, wherein the survey system is further configured to measure CP potentials at time intervals of about 0.001 seconds or greater.

* * * * *